(12) United States Patent
Bednarski et al.

(10) Patent No.: US 12,518,574 B1
(45) Date of Patent: Jan. 6, 2026

(54) MANAGING VEHICLE DIAGNOSTICS BASED ON PROCESSED CUSTOMER INPUTS

(71) Applicant: TESLA, INC., Austin, TX (US)

(72) Inventors: Derek Bednarski, Mountain View, CA (US); Stephen Nees, Irvine, CA (US); Mahika Dubey, Cupertino, CA (US); Sean Kitada, San Francisco, CA (US); Ghizlane Bounoua, San Francisco, CA (US)

(73) Assignee: Tesla, Inc., Austin, TX (US)

( * ) Notice: Subject to any disclaimer, the term of this patent is extended or adjusted under 35 U.S.C. 154(b) by 357 days.

(21) Appl. No.: 17/823,851

(22) Filed: Aug. 31, 2022

Related U.S. Application Data

(60) Provisional application No. 63/239,331, filed on Aug. 31, 2021.

(51) Int. Cl.
*G07C 5/08* (2006.01)
*G06Q 10/20* (2023.01)

(52) U.S. Cl.
CPC ........... *G07C 5/0808* (2013.01); *G06Q 10/20* (2013.01)

(58) Field of Classification Search
CPC .............................. G07C 5/0808; G06Q 10/20
See application file for complete search history.

(56) References Cited

U.S. PATENT DOCUMENTS

| 2017/0109947 A1* | 4/2017 | Prokhorov | .............. G10L 15/22 |
| 2020/0020331 A1* | 1/2020 | Kim | ........................ G10L 15/30 |
| 2022/0058579 A1* | 2/2022 | Chong | .................. G06Q 40/08 |

* cited by examiner

*Primary Examiner* — Aryan E Weisenfeld
(74) *Attorney, Agent, or Firm* — Knobbe, Martens, Olson & Bear, LLP

(57) ABSTRACT

Aspects of the present application correspond to vehicle diagnostic management service by utilizing a set of customer input from a customer. One aspect of the present application corresponds to the utilization of a set of customer inputs from the customer to predict vehicle symptoms associated with the customer input. In another aspect, the present application corresponds to determining action group for each predicted vehicle symptom. In another aspect, the present application. The customer input can be processed to predict vehicle symptoms. In another aspect, the present application corresponds to providing vehicle diagnostic and repair services for the customer.

14 Claims, 4 Drawing Sheets

MANAGING VEHICLE DIAGNOSTICS BASED ON PROCESSED CUSTOMER INPUTS

CROSS-REFERENCE TO RELATED APPLICATIONS

This application claims prior to U.S. Provisional Application No. 63/239,331 entitled MANAGING VEHICLE DIAGNOSTICS BASED ON PROCESSED USER INPUTS on Aug. 31, 2021. U.S. Provisional Application No. 63/239,331 is incorporated by reference in its entirety herein.

BACKGROUND

Generally described, computing devices and communication networks can be utilized to exchange data and/or information. In a common application, a computing device can request content from another computing device via the communication network. For example, a customer at a personal computing device can utilize a browser application to request a content page (e.g., a network page, a Web page, etc.) from a server computing device via the network (e.g., the Internet). In such embodiments, the customer computing device can be referred to as a client computing device, and the server computing device can be referred to as a service provider. In another embodiment, the customer computing device can collect or generate information and provide the collected information to a server computing device for further processing or analysis.

A variety of vehicles, such as electric vehicles, combustion engine vehicles, hybrid vehicles, etc., can be configured with various sensors and components to facilitate the operation of the vehicle or management of one or more systems and/or components included in the vehicle, such as hardware and software components. In certain scenarios, a vehicle owner or vehicle user ("customer") may wish to provide input related to the vehicle by utilizing a network connected to a vehicle diagnostic management service. In certain scenarios, the vehicle service provider may wish to tender the vehicle diagnostic or service by utilizing the network to access vehicle data. For example, the vehicle service provider may analyze the input and perform a diagnostic or vehicle service by accessing a portion of the vehicle data. In some embodiments, the vehicle service provider can implement a vehicle diagnostic management service that analyzes the customer input and performs the vehicle diagnostic and/or services associated with the analyzed customer input. In some embodiments, the vehicle diagnostic management service, based on the diagnostic results, provides a vehicle diagnostic service.

BRIEF DESCRIPTION OF THE DRAWINGS

This disclosure is described herein with reference to drawings of certain embodiments, which are intended to illustrate, but not to limit, the present disclosure. It is to be understood that the accompanying drawings, which are incorporated in and constitute a part of this specification, are for the purpose of illustrating concepts disclosed herein and may not be to scale.

DETAILED DESCRIPTION

Figure 1:
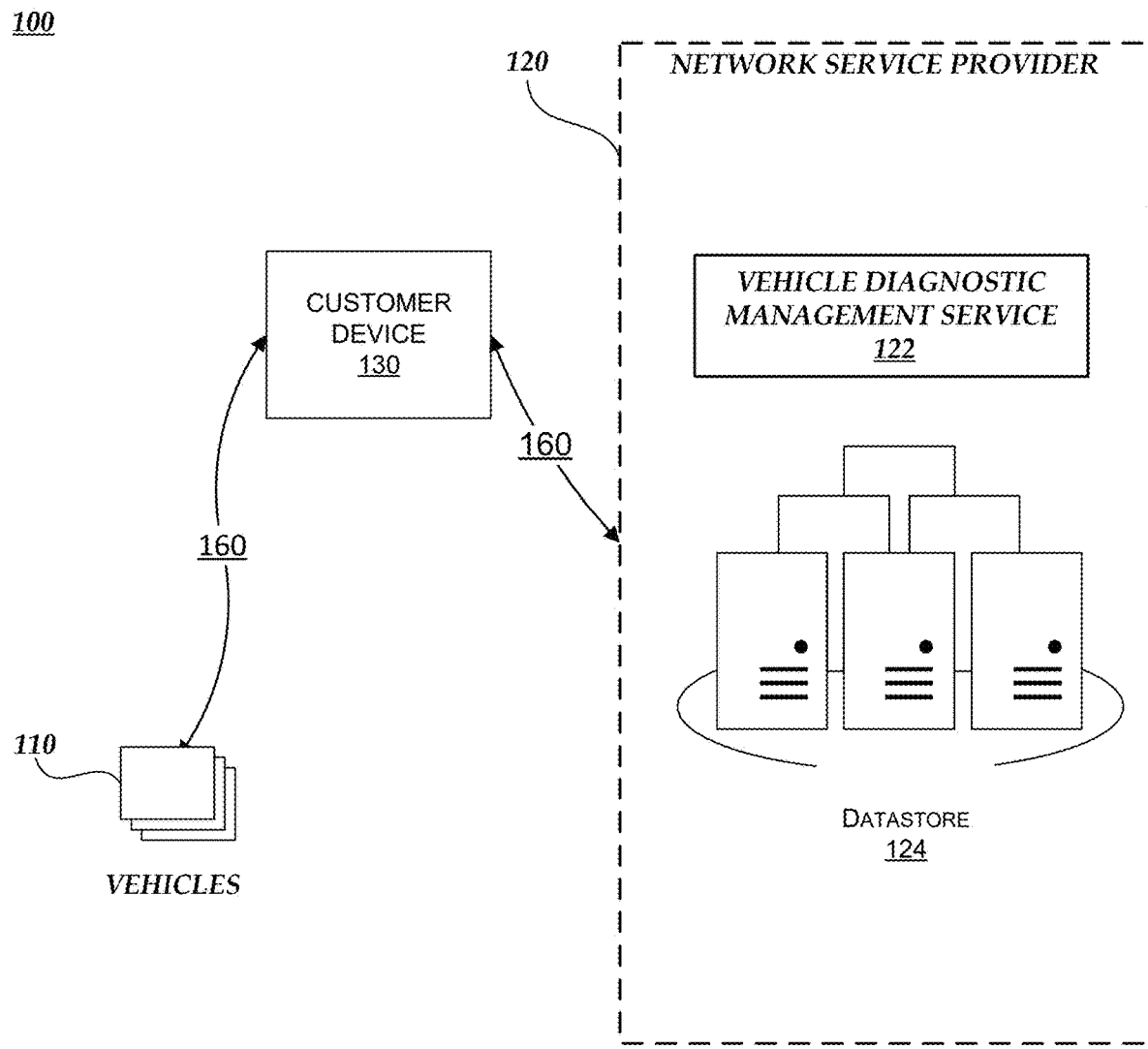
FIG. 1 depicts a block diagram of an illustrative environment for providing configuration and management of vehicle services based on customer input in accordance with one or more aspects of the present disclosure.

Aspects of the present disclosure related to systems and methods for managing vehicle diagnostic based on processed customer input. By way of illustrative example, aspects of the present application correspond to analyzing customer input to determine one or more actions to be performed for vehicle services. In some embodiments, a customer may provide an input in a context of a natural human language, and the customer input can be processed or filtered to correlate with one or more vehicle symptoms. For example, the processed customer input can be utilized to predict vehicle symptoms, where symptoms are related to the customer input. In another illustrative example, aspects of the present application correspond to determining one or more action groups corresponding to each vehicle symptom. In some embodiments, the action group represents a set of corrective actions to perform for each vehicle symptom. In another illustrative example, based on the action group, a vehicle service can be performed by diagnosing vehicle data corresponding to the action group. The vehicle data may include, but is not limited to, logs of information previously collected or generated by sensor and processing components, current vehicle data, or third-party data collected by the vehicle, and the like. For example, vehicle data associated with each vehicle symptom can be assessed and diagnosed to determine required vehicle services.

Illustratively, the customer input (including customer concerns about a vehicle) can be captured through interactions with vehicle interfaces, mobile applications, or other computing devices (e.g., kiosks, tablets, etc.). Such interactions can be based on predefined categories that are selectable by a customer via an interface. Such interactions can also be based on a narrative type of input, such as via spoken language, typed comments, etc., that can be processed to extract key terms, etc. Illustratively, a network service provider can utilize third-party services to facilitate with the collection or processing of the customer input. For example, the network service provider could use a third-party processing service that can receive spoken input and return keywords or transcriptions. In another example, a third-party service provider may host a different software application that collects customer input and sends it to the network service provider. For example, an authorized reseller hosts its own "service" app that sends the information to the network service provider for facilitating services. Still further, in some aspects, the customer input can also include the collection of vehicle operational parameters that may be applicable or relevant to the customer input, such as sensor/instrument values, warnings or notifications, recommended action items, and the like.

In accordance with aspects of the present application, one or more customer inputs can be characterized as a likelihood of pertaining to one or more of a set of defined action groups. Individual action groups define an associated symptom/cause and a confidence value of mapping the symptom/cause with the captured customer input. The individual action group then defines one or more corrective or responsive actions that can be implemented by vehicles, technician, additional third parties, and the like. Accordingly, based on the mapping of input to action groups, the network service provider can define and execute actions (e.g., diagnostic actions, information collection actions, or corrective actions) that may be utilized to complete the requested service or addressed the observed vehicle parameter.

Illustratively, the network service provider can select an associated action group by first applying some form of threshold or filtering any action groups that do not meet a minimum threshold of confidence values. For example, action groups not having a confidence value of greater than 60%, 65%, 70%, 75%, or other specified value may be removed from consideration. The confidence values may be attributable/assigned to action group symptoms based on manual input, machine learning implementations, and the like and may be updated based on historic information based on individual experiences unique to a customer or vehicle, organizational experiences unique to a defined subset of individuals or vehicles, or more universally applicable thresholds. Thereafter, the remaining potentially applicable action groups may be ranked or sorted in a manner to select the most likely applicable action group. The sorting or ranking may be based strictly on numerical principles or via a weighted scheme, such as weighting based on historical interactions with the customer, vehicle, sets of vehicles, sets of customers, or combination thereof. In some embodiments, if the confidence values of any of the action groups do not meet a threshold (which may be the same or different threshold from the filtering threshold), the network service provider can cause the system to gather supplemental customer inputs or perform initial diagnosis prior to selecting an action group.

Each individual action group (once selected) then defines a set of actions, such as diagnostic, informative, or corrective actions, that facilitate the service workflow based on the customer input. For example, the actions can include executing automated information collection tools/apps that are able to collect vehicle data and identify data patterns. In another example, the actions can include executing automated diagnostic tools that can be executed by a vehicle. The diagnostic tools are accessible by the technician as provided by the vehicle. Alternatively, the technician can cause the diagnostic tool to be provided for execution by the vehicle. In a further example, the actions can include a specification of third-party data sources that may provide additional information or generate required information (e.g., documentation or codes for insurance companies). The actions may be considered in some embodiments to be binary such that identification of the action group results in the execution of the actions. The actions may also be alternatively associated with confidence values/weights that provide the network service with an ability to rank, sort or dynamically select a subset of the actions based on customer input, vehicle parameters, and the like.

In some embodiments, some action groups may specify a wide variety of actions, which may be in a logical order (e.g., information gathering/diagnostic/repair). In other embodiments, an action group may be limited to specific types of actions, such as diagnostic or repair, while omitting other actions, e.g., information gathering. The actions can also be structured or ordered in a manner such that the outcome/result of a preceding action may have dependency or influence on the subsequent actions (e.g., values from information gather may dictate which diagnostic actions are selected). Still, further, the actions may also include prioritization information that can be utilized in the execution/authorization of the action. For example, an action that is characterized as a critical service action may not only elicit an action for diagnostics or repair but also include information that provides prioritization information. The prioritization information can be utilized in how or when notifications are provided to the customers (e.g., alerting). The prioritization information can also elicit a more immediate response from the service provider, such as prioritization in scheduling services or providing alternative transportation.

Action groups may be illustratively mapped or clustered based on the organization of a vehicle, such that actions groups may be able to be matched to the major organizational groups of a vehicle (e.g., power train, HVAC, etc.). Other action groups may be mapped to individual components or services. Still, further action groups may be continuously monitored, adjusted or updated based on processing results by the network service provider. For example, an action group that is rarely selected may be modified or blended. In another example, an action group that does not result in appropriate service experience or an incorrect diagnosis may be eliminated, updated, or divided.

Generally, traditional approaches to performing a vehicle service is based on onsite vehicle inspection, vehicle diagnosis, and vehicle repair by a technician. More specifically, a customer tenders a vehicle to a service center that provides the technician with physical access to the vehicle, and the customer explains about the vehicle. Then, based on the customer's explanation, the technician performs a diagnosis and repairs the vehicle. These traditional approaches can cause inefficiency for both the customer and a vehicle service center. In one aspect, the customer has to visit the service center (or a technician has to be in physical proximity to the vehicle). In another aspect, a technician performs a vehicle diagnosis based on the customer's explanation. In this aspect, the diagnosis results can be different depending on the technician's knowledge or level of experience. In another aspect, the technician performs the vehicle repair based on the diagnosis result. In this aspect, since the diagnosis result can be different depending on the technician's knowledge, the vehicle repair result can be different. For example, a technician may require a diagnosis and perform a vehicle repair, but the diagnosis result can be incorrect because the technician might not understand the customer's explanation. Further, the customer may have to reschedule the service appointment and perform the above vehicle service process. In another aspect, the repair only requires a software update on the vehicle, however, the customer may have to perform the above vehicle service process. Thus, the traditional approaches for vehicle service can be inefficient for both the customers and vehicle service center.

To address at least a portion of the above identified inefficiencies, a vehicle service provider can facilitate an automated vehicle service process by utilizing a network communication. In some embodiments, a customer can provide a customer input by utilizing a customer device and a network based service, a vehicle diagnostic management service, analyzes the customer input and perform vehicle services based on the analyzed results of the customer input.

In accordance with an illustrative embodiment, one or more aspects of the present disclosure relate to providing vehicle services by performing customer input analysis. A vehicle diagnostic management service can facilitate analyzing the customer input by utilizing its network resources and by accessing the portion of the vehicle data to determine one or more associated vehicle symptoms. The vehicle diagnostic management service may further facilitate diagnosing the vehicle based on each vehicle symptoms by analyzing the vehicle data related to the vehicle symptoms. The vehicle diagnostic management service may perform one or more aspects of the present disclosure via a common interface provided through the vehicle without requiring customized software, applications, or external computing devices.

In some embodiments, the customer input provided by the customer (e.g., a vehicle owner, user, manager, administrator, etc.) can be processed or analyzed to determine one or more vehicle symptoms related to the customer input. In these embodiments, the customer input can be processed to determine one or more key terms that can be used to predict vehicle symptoms. In some embodiments, the vehicle symptoms are pre-categorized (e.g., predefined) into a plurality of categories, and the customer input can be analyzed to determine one or more categories from the plurality of categories. For example, the customer input is processed to determine one or more vehicle symptoms related to the customer input.

In some embodiments, customer input can be provided in the context of natural human language. This customer input can be provided as a narrative language in written format or spoken languages. In some embodiments, at least one service provided by the vehicle diagnostic management service can process the natural languages. Illustratively, a customer may provide input in a context of a human language by communicating with a customer device, and the vehicle diagnostic management service can process the natural language to predict vehicle symptoms and required action. In some embodiments, the vehicle diagnostic management service may be configured to utilize a machine learned model to process and analyze the natural human languages. For example, a customer may speak about the vehicle, such as a sentence that "this car does not accelerate as before," then the vehicle service provider may analyze the customer input and determine vehicle symptoms related to the customer input, such as "a fluid is leaking in engine and/or transmission," "engine oil level is too low," "a transmission is not changing its gear," etc. In some embodiments, the vehicle diagnostic management service utilizes the machine learned model to predict vehicle symptoms. In these embodiments, the machine learned model might predict vehicles symptoms by analyzing the customer input.

In some embodiments, the customer input can be mapped into one or more action groups. Action group can be defined as one or more corrective actions corresponding to the symptom, and each action group may represent corrective actions required to perform in order to resolve each symptom. For example, the customer input can be processed to determine one or more symptoms, and each symptom can be correlated with an action group. Thus, the customer input can be mapped into the action groups. In some embodiments, the action group can be correlated with customer instruction. For example, if one of the symptoms is "a fluid is leaking in engine and/or transmission," the action group can include "diagnosing engine operating log" or "diagnosing fluids level." In this example, the vehicle diagnostic management service may acquire vehicle data related to each action and perform a vehicle diagnosis. Based on the diagnosis result, the vehicle diagnostic management service may provide customer instructions, such as a remote repair by updating component related to the vehicle operation, such as an electrical control unit (ECU) of the vehicle. In another example, the action group may include replacing an engine oil pan, then the vehicle diagnostic management service may provide an instruction that requires onsite service for the customer. In this example, the vehicle diagnostic management service may provide information related to the onsite service, such as scheduling appointments, parts required for the repair, estimated time, estimated repair cost, etc.

Illustratively, by utilization of a network service provider, a vehicle diagnostic management service can establish data communications with a vehicle and a customer device. This may allow the vehicle diagnostic management service to obtain customer input from the customer device and vehicle data to facilitate vehicle services. The vehicle services, for example, can include diagnosis of vehicle performance, identification of potential issues, advanced ordering of parts, and the like. The data communications can also allow the customer to provide customer input by utilizing a customer device and allow the vehicle diagnostic management service to cause the vehicle to execute executable code or configurations that facilitate diagnostics, repairs, updates, upgrades, and the like. Still, further, customers can control one or more attributes of the data communication channels, including duration of access, type of access, restrictions and the like.

In some embodiments, the vehicle diagnostic management service can be implemented to the network service provider. The vehicle diagnostic management service may perform the vehicle services. Illustratively, the vehicle diagnostic management service may obtain customer input by utilizing a network and provide a vehicle services by analyzing the customer input and accessing to the portion of vehicle data.

In some embodiments, a vehicle may include one or more electronic components positioned in or on a vehicle, where the electronic component is configured to communicate with the network service provider and the customer device. In some embodiments, the customer device can be implemented as electrical component of the vehicle. In some embodiments, the vehicle may include electronic components and storage to store the vehicle data. In these embodiments, any data generated from the vehicle can be stored in the storage. The data, for example, can include log data generated from sensors installed in the vehicle, any processed data related to the vehicle operation such as engine oil data, coolant temperature, milage, oxygen, knocking information from various sensors, etc. The data can also include associated data and automated driving (e.g., self driving) related data. In one embodiment, the data can be received from an external device.

In some embodiments, the vehicle diagnostic management service may determine one or more vehicle symptoms related to the customer input. In these embodiments, the vehicle diagnostic management service may utilize a machine learned model to analyze the customer input. Further, the machine learned model could be utilized to predict symptoms related to the customer input. In some embodiments, each predicted symptom can be characterized with confidence values. The confidence value can represent a level of confidence corresponding to each predicted symptom. In some embodiments, the vehicle diagnostic management service may analyze the customer input and identify one or more action groups based on the analyzed results. In these embodiments, the action groups can be prioritized based on the confidence value corresponding to each predicted symptom. For example, action group associated with the predicted symptom with the highest confidence value can be the highest priority action group. In this example, the vehicle service can be performed based on the prioritized action groups.

Although the various aspects will be described in accordance with illustrative embodiments and a combination of features, one skilled in the relevant art will appreciate that the examples and combination of features are illustrative in nature and should not be construed as limiting. More specifically, aspects of the present application may be applicable to various types of vehicle data or vehicle processes. However, one skilled in the relevant art will appreciate that the aspects of the present application are not necessarily limited to application to any particular type of vehicle data, data communications or illustrative interaction between third parties, customers, and a network service provider.

FIG. 1 depicts a block diagram of an illustrative environment of a system 100 for providing configuration and management of services associated with vehicles based on customer input in accordance with one or more aspects of the present disclosure. The system 100 can comprise a network 160, the network connecting a set of vehicles 110, a network service provider 120, and one or more customer devices 130. The components may correspond to software modules implemented or executed by one or more external computing devices, which may be separate stand-alone external computing devices. Accordingly, the components of the network service provider 120 should be considered as a logical representation of the service, not requiring any specific implementation on one or more external computing devices.

The customer device 130, as depicted in FIG. 1, can be any computing device, such as a desktop, laptop, personal computer, tablet computer, wearable computer, server, personal digital assistant (PDA), hybrid PDA/mobile phone, mobile phone, smartphone, set-top box, voice command device, digital media player, and the like. The customer device 130 may execute an application (e.g., a browser, a stand-alone application, etc.) that allows a user to access interactive user interfaces, view images, analyses, aggregated data, and/or the like as described herein. In some embodiments, the customer device 130 can be implemented to the vehicle 110 as a functionality of the vehicle 110. For example, the vehicle 110 may perform the functions implemented in the customer device 130 by utilizing the vehicle's resources, such as the vehicle's processors and memory.

Network 160, as depicted in FIG. 1, can connect the vehicles 110, customer devices, 130, and network service provider 120. The network 160 can connect any number of devices. In some embodiments, the network service provider 120 provides network-based services to customer devices 130 via a network. A network service provider implements network-based services and refers to a large, shared pool of network-accessible computing resources (such as compute, storage, or networking resources, applications, or services), which may be virtualized or bare-metal. The network service provider can provide on-demand network access to a shared pool of configurable computing resources that can be programmatically provisioned and released in response to customer commands. These resources can be dynamically provisioned and reconfigured to adjust to the variable load. The concept of "cloud computing" or "network-based computing" can thus be considered as both the applications delivered as services over the network and the hardware and software in the network service provider that provide those services.

A network 160 can comprise any combination of wired and/or wireless networks, such as one or more direct communication channels, local area network, wide area network, personal area network, and/or the Internet, for example. In some embodiments, communication between the vehicle 110 and the customer device 130 may be performed via a short-range communication protocol, such as Bluetooth, Bluetooth low energy ("BLE"), and/or near field communications ("NFC"). Communication between the vehicle 110 and the network service provider 120 can occur via network 150, such as via one or more secured networks, such as a local area network that communicates securely via the Internet with the network service provider 120. However, networks 150, 160 may include some or all of the same communication protocols, services, hardware, etc. Thus, although the discussion herein may describe communication between the vehicle 110 and the customer device 130 via the network 160 and communication between the vehicle 110 and the network service provider 120 via the network 150, communications of the devices are not limited in this manner. The various communication protocols discussed herein are merely examples, and the present application is not limited thereto.

In some embodiments, the network 160 can utilize a high-speed 4G LTE or other wireless communication technology, such as 5G communications. Thus, in some embodiments, the network 160 may include one or more wireless networks, such as a Global System for Mobile Communications (GSM) network, a Code Division Multiple Access (CDMA) network, a Long Term Evolution (LTE) network, or any other type of wireless network. Network 160 can use protocols and components for communicating via the Internet or any of the other aforementioned types of networks. For example, the protocols used by the networks 160 may include Hypertext Transfer Protocol (HTTP), HTTP Secure (HTTPS), Message Queue Telemetry Transport (MQTT), and Constrained Application Protocol (CoAP), and the like. Protocols and components for communicating via the Internet or any of the other aforementioned types of communication networks are well known to those skilled in the art and, thus, are not described in more detail herein Illustratively, the set of vehicle 110 corresponds to one or more vehicles configured with data storage for storing data generated from electrical components in the vehicle 110. The data, for example, can include log data generated from sensors installed in the vehicle, any processed data related to the vehicle operation such as engine oil data, coolant temperature, milage, oxygen, knocking information from various sensors, etc. The data can also include diagnosed data, an automated driving (e.g., self driving) related data. In one embodiment, the data can be received from an external device.

Illustratively, the network service provider 120 can include a vehicle diagnostic management service 122 that can provide functionality responsive to processing customer input to provide configuration and management of services associated with vehicle based on the processed customer input as applied to aspects of the present application. The network-based service can include a plurality of datastores 124 for maintaining various information associated with aspects of the present application. The vehicle diagnostic management service 122 in FIG. 1 is logical in nature and can be implemented in the network service provider 120 in a variety of manners.

Figure 2:
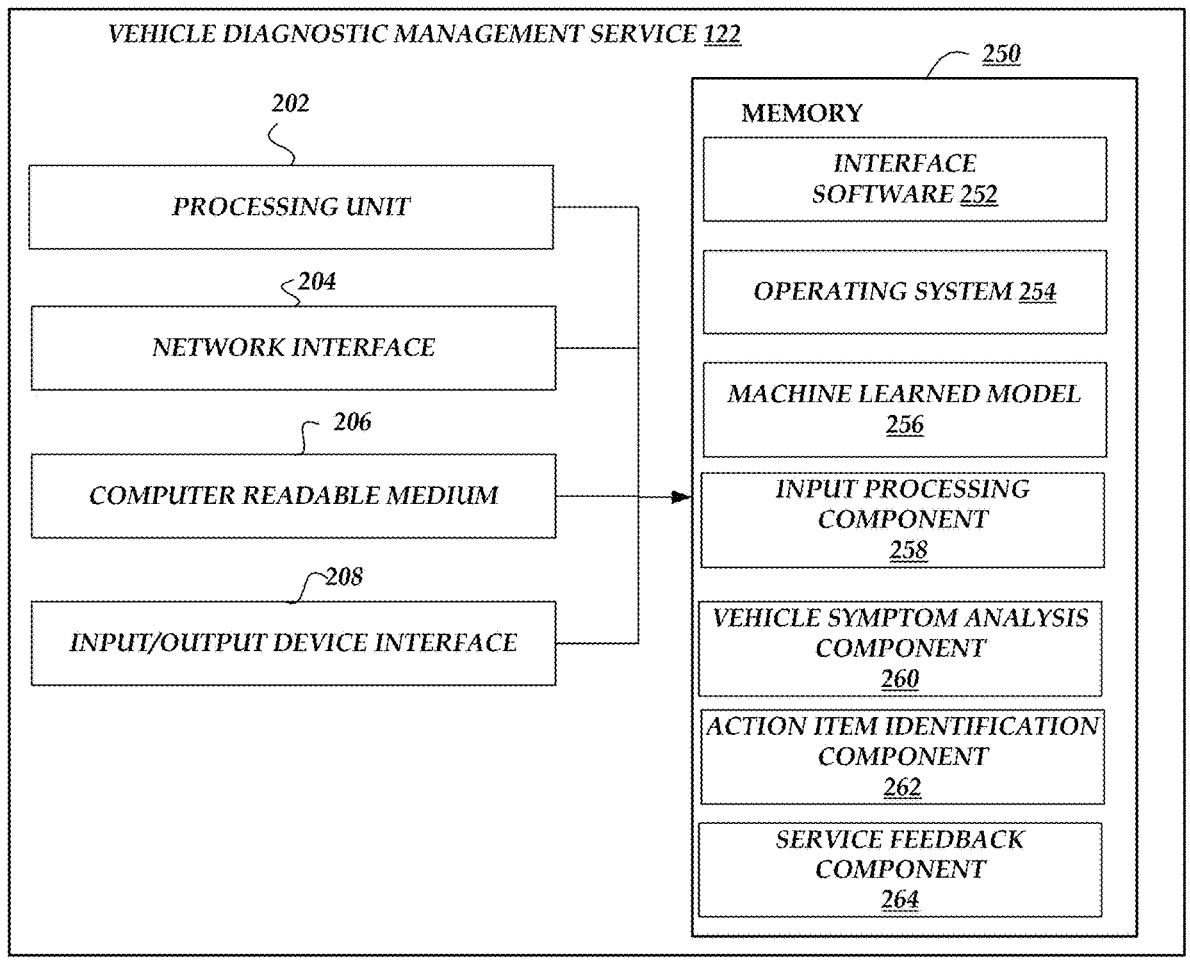
FIG. 2 depicts an illustrative architecture for implementing a vehicle diagnostic management service in accordance with aspects of the present application.

With reference now to FIG. 2, an illustrative architecture for implementing the vehicle diagnostic management service 122 on one or more local resources or a network service will be described. The vehicle diagnostic management service 122 may be part of components/systems that provide functionality associated with a vehicle service provider and the like.

The architecture of FIG. 2 is illustrative in nature and should not be construed as requiring any specific hardware or software configuration for the vehicle diagnostic management service 122. The general architecture of the vehicle diagnostic management service 122 depicted in FIG. 2 includes an arrangement of computer hardware and software components that may be used to implement aspects of the present disclosure. As illustrated, the vehicle diagnostic management service 122 includes a processing unit 202, a network interface 204, a computer readable medium drive 206, and an input/output device interface 208, all of which may communicate with one another by way of a communication bus. The components of the vehicle diagnostic management service 122 may be physical hardware components or implemented in a virtualized environment.

The network interface 204 may provide connectivity to one or more networks or computing systems, such as the network of FIG. 1. The processing unit 202 may thus receive information and instructions from other computing systems or services via a network. The processing unit 202 may also communicate to and from memory 250 and further provide output information for an optional display (not shown) via the input/output device interface 208. In some embodiments, the vehicle diagnostic management service 122 may include more (or fewer) components than those shown in FIG. 2.

The memory 250 may include computer program instructions that the processing unit 202 executes in order to implement one or more embodiments. The memory 250 generally includes RAM, ROM, or other persistent or non-transitory memory. The memory 250 may store interface software 252 and an operating system 254 that provides computer program instructions for use by the processing unit 202 in the general administration and operation of the vehicle diagnostic management service 122. The memory 250 may further include computer program instructions and other information for implementing aspects of the present disclosure.

The memory 250 can include a machine learned model 256. The machine learned model 256 can be used to assist one or more components in the memory 250, such as an input processing component, a vehicle symptom analysis component 260, an action group identification component 262, and/or a service feedback component 264. As described in below, in some embodiments, the machine learned model 256 can be utilized to process customer input. In these embodiments, the machine learned model 256 might process natural human language, such as a narrative language input, to be used for identifying one or more symptoms related to a vehicle. In some embodiments, the machine learned model 256 could be utilized to predict one or more symptoms related to the vehicle based on the customer input. In these embodiments, the machine learned model 256 could use one or more machine learning algorithms to generate one or more prediction models or parameter functions to identify symptoms. In some embodiments, the machine learned model 256 could be utilized to determine a confidence value associated with each identified symptom. For example, the machine learned model 256 might generate a confidence value corresponding to each identified symptom, where the confidence value may represent correctness of symptom identification for each identified symptom. In some embodiments, the machine learned model 256 could utilize a vehicle or customer profile as one of the parameters for the prediction model. For example, the machine learned model 256 might determine the confidence value based on the vehicle's service history.

In some embodiments, the machine learned model 256 can be trained by updating its prediction algorithms and/or parameters. For example, the machine learned model 256 output data in analyzing natural human languages and predicting symptoms or predicting symptoms with confidence value can be stored in a datastore 124 (shown in FIG. 1). In this example, if the machine learned model 256 incorrectly identified one or more symptoms, the system administrator (e.g., system manager, developer, etc.) may manually modify the identified symptoms. These modifications can be stored in the datastore 124 as a set of modification data, and the modification data can be used to update the machine learned model 256.

The memory 250 can also include an input processing component 258. In some embodiments, the customer, by utilizing the customer device 130, can provide customer input, and the input processing component 258 can filter the customer input to be used for predicting one or more symptoms related to the customer input. For example, the input processing component 258 extract one or more key terms from the customer input, where the key terms can be used to predict symptoms. In these embodiments, the customer input can be provided to the input processing component 258 in the form of a text or in a context of verbal expression.

In some embodiments, the customer may provide the customer input in a form of a natural language. In these embodiments, the customer input can be narrative. For example, the customer may type one or more sentences related to the vehicle or speak about the vehicle in the context of natural human language. In some embodiments, the input processing component 258 process these customer input to determine one or more customer input that can be used for predicting the vehicle symptoms. For example, the customer input can be "my car has a yellow border around the touchscreen." In this example, the input processing component 258 may filter the customer input and determine "a touch screen malfunction." In another example, the customer input can be "my car pulls to the left on the highway." In this example, the input processing component 258 processes the customer input and determine the customer input as "wheels are not aligned."

In some embodiments, the input processing component 258 can be configured to utilize a machine learned model 256 to process the natural language provided as customer input. For example, if the customer input is "my car stink," the machine learned model 256 may process the customer input and determine the customer input as "heating ventilation and air conditioning (HAVC) system malfunction."

In some embodiments, the input processing component 258 receives the customer input as a set of vehicle symptoms. In these embodiments, the customer device 130 may provide a list of vehicle symptoms, and the customer may select one or more symptoms from the list of vehicle symptoms. For example, the customer device 130 may have a list of predefined vehicle symptoms, such as "engine check light on," "vehicle vibration," "safety feature inoperable," "battery malfunction," etc. In this example, the customer may select one or more symptoms from the list of predefined vehicle symptoms. Then, the input processing component 258 may receive the customer input and transmit it to other components, such as a vehicle symptom analysis component 260, action group identification component 262, and/or service feedback component 264, for further performing the vehicle service.

The memory 250 can also include a vehicle symptom analysis component 260. In some embodiments, the vehicle symptom analysis component 260 analyzes the processed customer input in the input processing component 258 to determine one or more symptoms related to the processed customer input. For example, if the input processing component 258 identifies "touchscreen mal-function," the vehicle symptom analysis component 260 may predict symptoms related to the touchscreen, such as "screen pixel malfunctioning," "screen discolored," "cosmetic issue," etc.

In some embodiments, the vehicle symptom analysis component 260 is configured to utilize the machine learned model 256 to predict the symptoms based on the processed customer input. In these embodiments, the machine learned model 256 may predict the symptoms by utilizing one or more machine learning algorithms to generate one or more prediction models or parameter functions to predict the symptoms. For example, based on the processed customer input, "heating ventilation and air conditioning (HAVC) system malfunction," the machine learned model 256 may predict following symptoms: "heating system is not working," "air vent is not opening," "evaporator mal-functioning," etc. In some embodiments, the machine learned model 256 uses the vehicle profile to predict the symptoms, such as the location of the vehicle, vehicle service history, etc. For example, if the vehicle is located in a humid area, the machine learned model 256 may predict symptoms by considering the geographical characteristic, such that the symptoms can further include "vehicle cabin has a mold." In another example, if the vehicle has service history, such as an "evaporator cleaning," the machine learned model 256 may predict a symptom as "evaporator has a mold."

In some embodiments, the vehicle symptom analysis component 260 may generate a confidence value associated with each symptom. For example, if the symptoms include "heating system is not working," "air vent is not opening," and "evaporator mal-functioning," the vehicle symptom analysis component 260 generates a confidence value for each symptom, such as "60%," "70%", and "80%," respectively. In some embodiments, the confidence value may be determined or updated based on historic information, such as based on individual experiences unique to a customer or vehicle, organizational experiences unique to defined subset of individuals or vehicles, or more universally applicable thresholds. For example, the confidence value is determined based on analyzing other same or similar types of vehicles' service records. In this example, the confidence value can be determined by analyzing service records related to the same type of vehicles or similar types of vehicles. In another example, the confidence value can be based on analyzing the customer's profile. In this example, the confidence value can be determined by considering the customer's geographic region. In another example, the confidence value can also be determined based on analyzing the customer's service history. In this example, symptoms that are related to one of the customer's service history can have a higher confidence value. In some embodiments, the vehicle symptom analysis component 260 can utilize the machine learned model 256 to determine the confidence value. These embodiments are provided as examples, and the present disclosure is not limited by the above embodiments.

The memory 250 can also include an action group identification component 262. In some embodiments, each individual action group (once selected) defines a set of actions, such as diagnostic, informative, or corrective actions, that facilitate the service workflow based on the customer input. For example, the actions can include executing automated information collection tools/apps that are able to collect vehicle data and identify data patterns. In another example, the actions can include executing automated diagnostic tools that can be executed by a vehicle. The diagnostic tools be accessible by the technician as provided by the vehicle. Alternatively, the technician can cause the diagnostic tool to be provided for execution by the vehicle. In a further example, the actions can include a specification of third-party data sources that may provide additional information or generate required information (e.g., documentation or codes for insurance companies). The actions may be considered in some embodiments to be binary such that identification of the action group results in the execution of the actions. The actions may also be alternatively associated with confidence values/weights that provides the network service with an ability to rank, sort or dynamically select a subset of the actions based on customer input, vehicle parameters, and the like. In some embodiments, the action group represents a set of corrective actions to perform a vehicle service, including diagnosis or repairing of the vehicle corresponding to the predicted symptoms. For example, if one of the predicted symptom is a "screen pixel malfunctioning," the action group can include "perform screen pixel diagnosis" and "replace touch screen if the diagnosis result is fail."

In some embodiments, some action groups may specify a wide variety of actions, which may be in logical order (e.g., information gathering/diagnostic/repair). In other embodiments, an action group may be limited to specific types of actions, such as diagnostic or repair, while omitting other actions, e.g., information gathering. The actions can also be structured or ordered in a manner such that the outcome/result of a preceding action may have dependency or influence on the subsequent actions (e.g., values from information gather may dictate which diagnostic actions are selected). Still further, the actions may also include prioritization information that can be utilized in the execution/authorization of the action. For example, an action that is characterized as a critical service action, may not only elicit an action for diagnostics or repair but also include information that provides prioritization information. The prioritization information can be utilized in how or when notifications are provided to the customers (e.g., alerting). The prioritization information can also be utilized to elicit a more immediate response from the service provider, such as prioritization in scheduling service or provide alternative transportation.

In some embodiments, action groups may be illustratively mapped or clustered based on the organization of a vehicle, such that action groups may be able to be matched to the major organizational groups of a vehicle (e.g., power train, HVAC, etc.). Other action groups may be mapped to individual components or services. Still, further, action groups may be continuously monitored, adjusted or updated based on processing results by the network service provider. For example, an action group that is rarely selected may modified or blended. In another example, an action group that does not result in appropriate service experience or an incorrect diagnosis may be eliminated, updated, or divided.

In some embodiments, the action group identification component 262 may map the customer input with the identified action group. For example, as shown in the above, if the customer's input is "my car has a yellow border around the touchscreen," the identified action groups, "perform screen pixel diagnosis," and "replace touch screen if the diagnosis result is failed," can be mapped with the customer input. In some embodiments, each customer input can be mapped with multiple action groups based on the customer input and predicted symptoms.

In some embodiments, the action group identification component 262 may prioritize (e.g., rank or cauterize) the identified action groups based on the confidence value corresponding to each symptom as predicted in the vehicle symptom analysis component 260. For example, if the symptoms include "heating system is not working," "air vent is not opening," and "evaporator mal-functioning," with a confidence value of "60%," "70%", and "80%," respectively, the identified action group corresponding to the "evaporator mal-functioning" can have the highest priority. In this example, the identified action group corresponding to the "air vent is not opening" and "heating system is not working" can be prioritized based on the confidence value. In some embodiments, the action group identification component 262 can utilize the machine learned model 256 to identify the action group corresponding to each predicted symptom.

In some embodiments, the action group identification component 262 filters the action groups based on the confidence value. For example, action groups associated with a predicted symptom having a threshold confidence value lower than the threshold values can be removed. Thus, the action group associated with predicted symptoms having a confidence value higher than the threshold value can be further processed to determine vehicle services associated with the action groups.

The memory 250 can also include a service feedback component 264 for providing feedback (or feedback characterization) to the customer. In some embodiments, the service feedback component 264 identifies the action group corresponding to each predicted symptom and generate feedback. For example, if the action group includes "perform screen pixel diagnosis" and "replace touch screen if the diagnosis result is fail," the service feedback component 264 may generate feedback, such as "request to perform a screen pixel diagnosis," and transmit the feedback to the customer via the customer device 130. In these embodiments, the customer may consent to perform the screen pixel diagnosis, and the vehicle diagnostic management service 122 may perform the diagnosis. In some embodiments, the service feedback component 264 may provide the diagnostic result to the customer by transmitting the diagnosis result to the customer device. In these embodiments, the service feedback component 264 may provide a repair procedure. For example, the service feedback component 264 may generate feedback, such as "diagnosis fail," and provide a repair procedure, such as "replace touch screen." In some embodiments, the service feedback component 264 may provide vehicle part required for the repair and estimated repair time and cost. For example, the service feedback component 264 may provide a repair part, such as a "touch screen," and estimated time for replacing the touch screen and the cost for replacing the touch screen.

Figure 3:
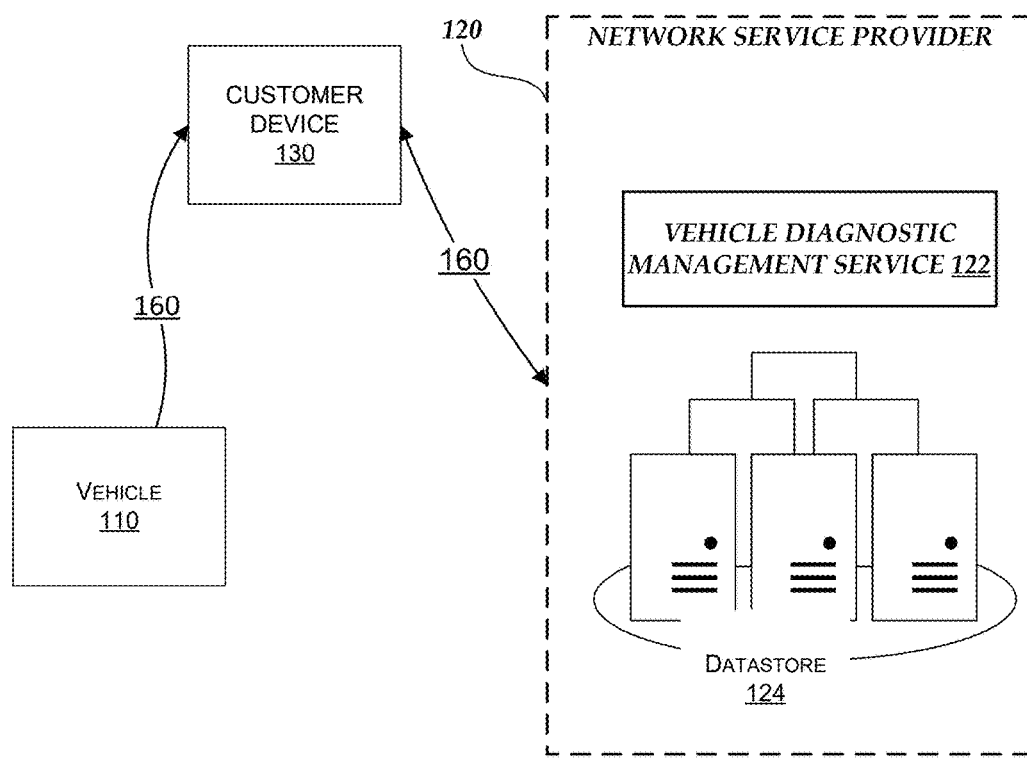
FIG. 3 is a block diagram of the illustrative environment of FIG. 1.

Turning now to FIG. 3, illustrative interactions of the components of the system 100 to provide vehicle service based on the processed result of a customer input will be described. For purposes of the illustration, it can be assumed that a network service provider 120 has been configured to implement a vehicle diagnostic management service 122 on behalf of a customer. The present application is not intended to be limited to any particular type of service provider or the number of individual services that may be accessed or generate processing results as part of an execution of an application on behalf of customers. Furthermore, the present application is not intended to be limited to the number of network service providers, as depicted in FIG. 1.

As shown in FIG. 3, at (1), a customer can provide customer input to the vehicle diagnostic management service 122 by transmitting the customer input via a customer device 130. The customer input corresponds to texts, images, and/or natural language. In some aspects, the customer input can also include the collection of vehicle operational parameters that may be applicable or relevant to the customer input, such as sensor/instrument values, warnings or notifications, recommended action items, and the like.

Illustratively, the customer can provide the customer input by utilizing the customer device 130. In some embodiments, the customer device 130 can be any computing device such as a desktop, laptop, personal computer, tablet computer, wearable computer, server, personal digital assistant (PDA), hybrid PDA/mobile phone, mobile phone, smartphone, set-top box, voice command device, digital media player, and the like. The customer device 130 may execute an application (e.g., a browser, a stand-alone application, etc.) that allows a customer to input the customer input and access interactive user interfaces, view images, analyses, aggregated data, and/or the like as described herein. In some embodiments, the customer device 130 can be implemented to the vehicle 110 as a functionality of the vehicle 110. For example, the vehicle 110 may perform the functions implemented in the customer device 130 by utilizing the vehicle's resources, such as the vehicle's processors and memory.

In some embodiments, the customer input can be provided to the vehicle diagnostic management service 122 in the form of a text or in the context of verbal expression. In some embodiments, the customer may provide the customer input in the form of a natural language. In these embodiments, the customer input can be narrative. For example, the customer may type one or more sentences related to the vehicle or speak about the vehicle in the context of natural human language.

At (2), the vehicle diagnostic management service 122 can receive the customer input. Illustratively, the vehicle diagnostic management service 122 can capture customer input through interactions with vehicle interfaces, mobile applications, or customer devices 130. Such interactions can be based on predefined categories that are selectable by a customer via an interface. Such interactions can also be based on a narrative type of input, such as via spoken language, typed comments, etc., that can be processed to extract key terms, etc. Illustratively, a network service provider can utilize third-party services to facilitate the collection or processing of the customer input. For example, the network service provider could use a third-party processing service that can receive spoken input and return keywords or transcriptions. In another example, a third-party service provider may host a different software application that collects customer input and sends it to the network service provider. For example, an authorized reseller hosts its own "service" app that sends the information to the network service provider for facilitating services.

Illustratively, the vehicle diagnostic management service 122 can receive the customer input by utilizing a network 160. In some embodiments, the network 160 can utilize a high-speed 4G LTE or other wireless communication technology, such as 5G communications. Thus, in some embodiments, the network 160 may include one or more wireless networks, such as a Global System for Mobile Communications (GSM) network, a Code Division Multiple Access (CDMA) network, a Long Term Evolution (LTE) network, or any other type of wireless network. Network 160 can use protocols and components for communicating via the Internet or any of the other aforementioned types of networks. For example, the protocols used by the networks 160 may include Hypertext Transfer Protocol (HTTP), HTTP Secure (HTTPS), Message Queue Telemetry Transport (MQTT), and Constrained Application Protocol (CoAP), and the like. Protocols and components for communicating via the Internet or any of the other aforementioned types of communication networks are well known to those skilled in the art and, thus, are not described in more detail herein.

At (3), the vehicle diagnostic management service 122 can process the customer input. The customer input corresponds to the vehicle, such as vehicle's operation, functions, cosmetic issues, etc. Illustratively, the vehicle diagnostic management service 122 may be configured to process the customer input by filtering the customer input to predict the vehicle symptoms and/or identify one or more action groups to perform vehicle services.

In some embodiments, the vehicle diagnostic management service 122 can filter the customer input to be used for predicting one or more symptoms related to the customer input. For example, the vehicle diagnostic management service 122 may extract (or identify) one or more key terms from the customer input, where the key terms can be used to predict symptoms. In some embodiments, the vehicle diagnostic management service 122 processes the customer input to determine one or more inputs that can be used for predicting the vehicle symptoms. For example, the customer input can be "my car has a yellow border around the touchscreen." In this example, the input processing component 258 may filter the customer input and determine "a touch screen mal-function." In another example, the customer input can be "my car pulls to the left on the highway." In this example, the input processing component 258 processes the customer input and determines the customer input as "wheels are not aligned."

In some embodiments, the vehicle diagnostic management service 122 can be configured to utilize a machine learned model 256 to process the natural language provided as a customer input. For example, if the customer input is "my car stink," the machine learned model 256 may process the customer input and determine the customer input as "heating ventilation and air conditioning (HAVC) system malfunction."

In some embodiments, the vehicle diagnostic management service 122 receives the customer input as a set of vehicle symptoms. In these embodiments, the customer device 130 may provide a list of vehicle symptoms, and the customer may select one or more symptoms from the list of vehicle symptoms. For example, the customer device 130 may has a list of predefined vehicle symptoms, such as "engine check light on," "vehicle vibration," "safety feature inoperable," "battery malfunction," etc. In this example, the customer may select one or more symptoms from the list of predefined vehicle symptoms. Then, the input processing component 258 may receive the customer input and transmit it to other components, such as a vehicle symptom analysis component 260, action group identification component 262, and/or service feedback component 264, for further performing the vehicle service.

At (4), the vehicle diagnostic management service 122 can predict symptoms associated with the customer input. In some embodiments, the vehicle diagnostic management service 122 utilizes the identified key terms by processing the customer input to predict one or more symptoms related to the customer input. For example, if the key term extracted from the customer input is a "touchscreen mal-function," the vehicle diagnostic management service 122 may predict symptoms related to the touchscreen, such as "screen pixel malfunctioning," "screen discolored," "cosmetic issue," etc.

In some embodiments, the vehicle diagnostic management service 122 is configured to utilize the machine learned model 256 to predict the symptoms based on the key terms. In these embodiments, the machine learned model 256 might predict the symptoms by utilizing one or more machine learning algorithms to generate one or more prediction models or parameter functions to predict the symptoms. For example, if an extracted key term from a customer input (such as "my car stink") is a "heating ventilation and air conditioning (HAVC) system malfunction," the vehicle diagnostic management service 122 might predict the following symptoms: "heating system is not working," "air vent is not opening," "evaporator mal-functioning," etc. In some embodiments, the machine learned model 256 uses the vehicle profile to predict the symptoms, such as the location of the vehicle, vehicle service history, etc. For example, if the vehicle is located in a humid area, the machine learned model 256 may predict symptoms by considering the geographical characteristic, such that the symptoms can further include "vehicle cabin has a mold." In another example, if the vehicle has a service history, such as an "evaporator cleaning," the machine learned model 256 may predict a symptom as "evaporator has a mold."

In some embodiments, the vehicle diagnostic management service 122 may generate a confidence value associated with each symptom. For example, if the symptoms include "heating system is not working," "air vent is not opening," and "evaporator mal-functioning," the vehicle symptom analysis component 260 generates a confidence value for each symptom, such as "60%," "70%", and "80%," respectively. In some embodiments, the confidence value is determined based on analyzing the same or similar types of vehicles' service records. For example, the confidence value can be determined by analyzing service records related to the same type of vehicles or similar types of vehicles. In some embodiments, the confidence value can be based on analyzing the customer's profile. For example, the confidence value can be determined by considering the customer's geographic region. In some embodiments, the confidence value can also be determined based on analyzing the customer's service history. For example, symptoms that are related to one of the customer's service history can have a higher confidence value. In some embodiments, the vehicle symptom analysis component 260 can utilize the machine learned model 256 to determine the confidence value. These embodiments are provided as examples, and the present disclosure is not limited by the above embodiments.

At (5), the vehicle diagnostic management service 122 can identify action groups associated with the predicted vehicle symptoms. In some embodiments, the action group represents a set of corrective actions to perform a vehicle service, including diagnosis or repairing of the vehicle corresponding to the predicted symptoms. For example, if one of the predicted symptoms is a "screen pixel malfunctioning," the action group can include "perform screen pixel diagnosis" and "replace touch screen if the diagnosis result is failed."

In some embodiments, action groups may be illustratively mapped or clustered based on the organization of a vehicle, such that action groups may be able to be matched to the major organizational groups of a vehicle (e.g., power train, HVAC, etc.). Other action groups may be mapped to individual components or services. Still, further, action groups may be continuously monitored, adjusted, or updated based on processing results by the network service provider. For example, an action group that is rarely selected may be modified or blended. In another example, an action group that does not result in appropriate service experience or an incorrect diagnosis may be eliminated, updated, or divided.

In some embodiments, the vehicle diagnostic management service 122 may map the customer input with the identified action group. For example, as shown in the above, if the customer's input is "my car has a yellow border around the touchscreen," the identified action groups, "perform screen pixel diagnosis" and "replace touch screen if the diagnosis result is failed," can be mapped with the customer input. In some embodiments, each customer input can be mapped with multiple action groups based on the customer input and predicted symptoms.

At (6), the vehicle diagnostic management service 122 can prioritize the identified action groups. In some embodiments, the vehicle diagnostic management service 122 may prioritize the identified action groups based on the confidence value corresponding to each symptom as predicted in the vehicle symptom analysis component 260. For example, if the symptoms include "heating system is not working," "air vent is not opening," and "evaporator mal-functioning," with a confidence value of "60%," "70%", and "80%," respectively, the identified action group corresponding to the "evaporator mal-functioning" can have the highest priority. In this example, the identified action group corresponding to the "air vent is not opening" and "heating system is not working" can be prioritized based on the confidence value. In some embodiments, the action group identification component 262 can utilize the machine learned model 256 to identify the action group corresponding to each predicted symptom.

In some embodiments, the vehicle diagnostic management service 122 may filter the identified action groups based on the confidence value. In these embodiments, action groups associated with symptoms having a confidence value less than the threshold or criteria can be filtered. For example, if the threshold confidence value is 75% and the symptoms include "heating system is not working," "air vent is not opening," and "evaporator mal-functioning," with a confidence value of "60%," "70%", and "80%," respectively, the action groups associated with the "heating system is not working" or "air vent is not opening can be filtered. Thus, the vehicle diagnostic management service 122 may not perform the diagnostic associated with the filtered action groups.

At (7), the vehicle diagnostic management service 122 can provide a vehicle diagnostic management service based on the identified action groups. In some embodiments, some action groups may specify a wide variety of actions, which may be in a logical order (e.g., information gathering/diagnostic/repair). In other embodiments, an action group may be limited to specific types of actions, such as diagnostic or repair, while omitting other actions, e.g., information gathering. The actions can also be structured or ordered in a manner such that the outcome/result of a preceding action may have dependency or influence on the subsequent actions (e.g., values from information gather may dictate which diagnostic actions are selected). Still, further, the actions may also include prioritization information that can be utilized in the execution/authorization of the action. For example, an action that is characterized as a critical service action may not only elicit action for diagnostics or repair but also include information that provides prioritization information. The prioritization information can be utilized in how or when notifications are provided to the customers (e.g., alerting). The prioritization information can also be utilized to elicit a more immediate response from the service provider, such as prioritization in scheduling services or providing alternative transportation.

In some embodiments, the vehicle diagnostic management service 122 identifies the action group corresponding to each predicted symptom and generate feedback. For example, if the action group includes "perform screen pixel diagnosis" and "replace touch screen if the diagnosis result is fail," the vehicle diagnostic management service 122 may generate feedback, such as "request to perform a screen pixel diagnosis," and transmit the feedback to the customer via the customer device 130. In these embodiments, the customer may consent to perform the screen pixel diagnosis, and the vehicle diagnostic management service 122 may perform the diagnosis. In some embodiments, the vehicle diagnostic management service 122 may provide the diagnostic result to the customer by transmitting the diagnosis result to the customer device. In these embodiments, the vehicle diagnostic management service 122 may provide a repair procedure. For example, the vehicle diagnostic management service 122 may generate feedback, such as "diagnosis fail," and provide a repair procedure, such as "replace touch screen." In some embodiments, vehicle diagnostic management service 122 may provide vehicle parts required for the repair and estimated repair time and cost. For example, the vehicle diagnostic management service 122 may provide a repair part, such as a "touch screen," and estimated time for replacing the touch screen and cost for replacing the touch screen.

Figure 4:
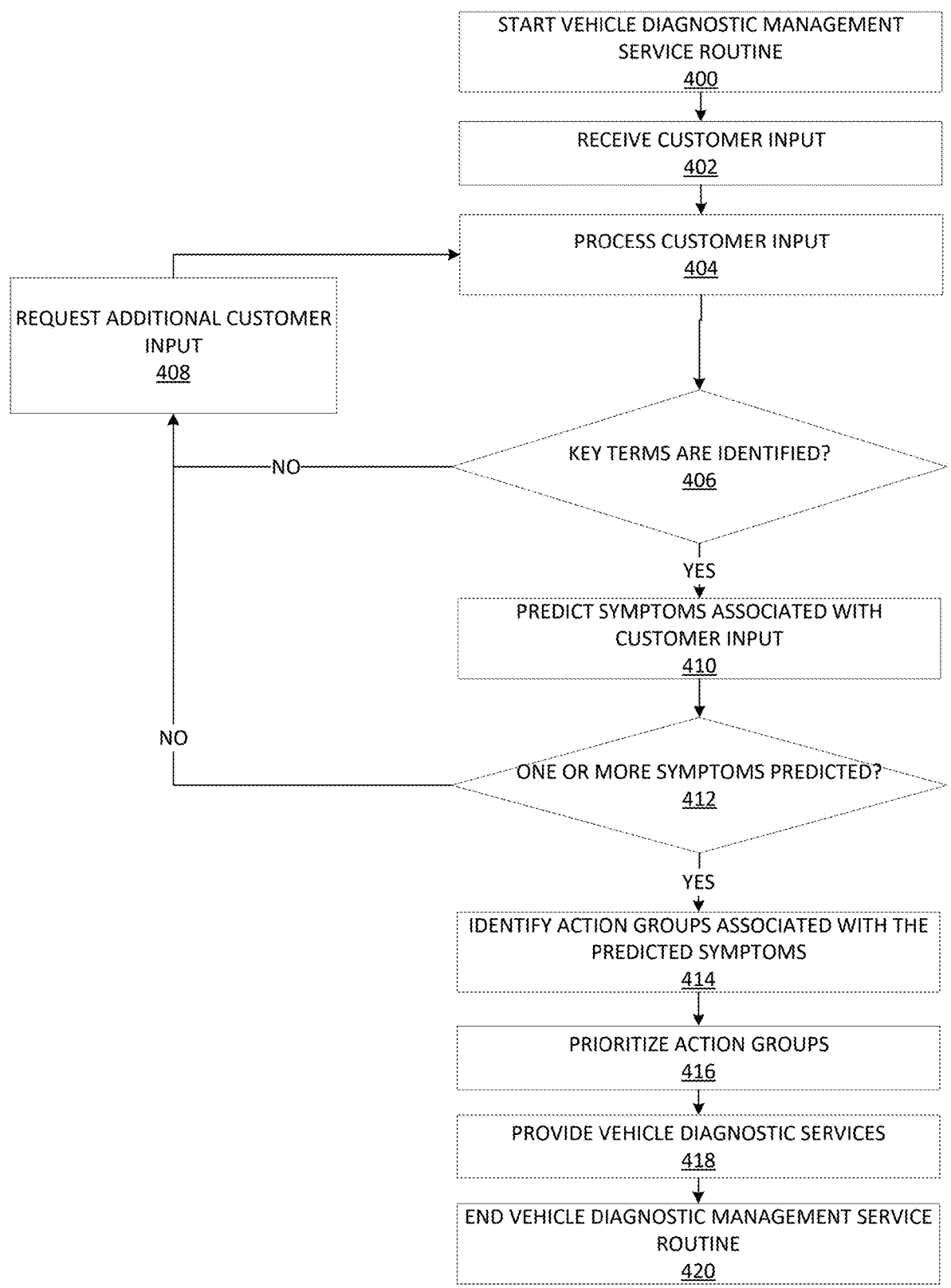
FIG. 4 is a flow chart describing a routine for providing vehicle diagnostic management service according to one or more embodiments as disclosed herein.

Turning now to FIG. 4, a routine 400 for performing vehicle diagnostic management service will be described. Routine 400 is illustratively implemented by the vehicle diagnostic management service 122.

At block 400, the vehicle diagnostic management service can be started. In some embodiments, a customer can provide customer input to the vehicle diagnostic management service 122 by transmitting the customer input via a customer device 130. The customer input corresponds to texts, images, and/or natural language. In some aspects, the customer input can also include the collection of vehicle operational parameters that may be applicable or relevant to the customer input, such as sensor/instrument values, warnings or notifications, recommended action items, and the like.

Illustratively, the customer can provide the customer input by utilizing the customer device 130. In some embodiments, the customer device 130 can be any computing device such as a desktop, laptop, personal computer, tablet computer, wearable computer, server, personal digital assistant (PDA), hybrid PDA/mobile phone, mobile phone, smartphone, set-top box, voice command device, digital media player, and the like. The customer device 130 may execute an application (e.g., a browser, a stand-alone application, etc.) that allows a customer to input the customer input and access interactive user interfaces, view images, analyses, aggregated data, and/or the like as described herein. In some embodiments, the customer device 130 can be implemented to the vehicle 110 as a functionality of the vehicle 110. For example, the vehicle 110 may perform the functions implemented in the customer device 130 by utilizing the vehicle's resources, such as the vehicle's processors and memory.

In some embodiments, the customer input can be provided to the vehicle diagnostic management service 122 in the form of a text or in the context of verbal expression. In some embodiments, the customer may provide the customer input in the form of a natural language. In these embodiments, the customer input can be narrative. For example, the customer may type one or more sentences related to the vehicle or speak about the vehicle in the context of natural human language.

At block 402, the vehicle diagnostic management service 122 can receive the customer input. Illustratively, the vehicle diagnostic management service 122 can capture customer input through interactions with vehicle interfaces, mobile applications, or customer devices 130. Such interactions can be based on predefined categories that are selectable by a customer via an interface. Such interactions can also be based on a narrative type of input, such as via spoken language, typed comments, etc., that can be processed to extract key terms, etc. Illustratively, a network service provider can utilize third-party services to facilitate the collection or processing of the customer input. For example, the network service provider could use a third-party processing service that can receive spoken input and return keywords or transcriptions. In another example, a third-party service provider may host a different software application that collects customer input and sends it to the network service provider. For example, an authorized reseller hosts its own "service" app that sends the information to the network service provider for facilitating services.

Illustratively, the vehicle diagnostic management service 122 can receive the customer input by utilizing a network 160. In some embodiments, the network 160 can utilize a high-speed 4G LTE or other wireless communication technology, such as 5G communications. Thus, in some embodiments, the network 160 may include one or more wireless networks, such as a Global System for Mobile Communications (GSM) network, a Code Division Multiple Access (CDMA) network, a Long Term Evolution (LTE) network, or any other type of wireless network. Network 160 can use protocols and components for communicating via the Internet or any of the other aforementioned types of networks. For example, the protocols used by the networks 160 may include Hypertext Transfer Protocol (HTTP), HTTP Secure (HTTPS), Message Queue Telemetry Transport (MQTT), and Constrained Application Protocol (CoAP), and the like. Protocols and components for communicating via the Internet or any of the other aforementioned types of communication networks are well known to those skilled in the art and, thus, are not described in more detail herein.

At block 404, the vehicle diagnostic management service 122 can process the customer input. The customer input corresponds to the vehicle, such as vehicle's operation, functions, cosmetic issues, etc.

Illustratively, the vehicle diagnostic management service 122 may be configured to process the customer input by filtering the customer input to predict the vehicle symptoms and/or identify one or more action groups to perform vehicle services.

In some embodiments, the vehicle diagnostic management service 122 can filter the customer input to be used for predicting one or more symptoms related to the customer input. For example, the vehicle diagnostic management service 122 may extract (or identify) one or more key terms from the customer input, where the key terms can be used to predict symptoms. In some embodiments, the vehicle diagnostic management service 122 processes the customer input to determine one or more inputs that can be used for predicting the vehicle symptoms. For example, the customer input can be "my car has a yellow border around the touchscreen." In this example, the input processing component 258 may filter the customer input and determine "a touch screen mal-function." In another example, the customer input can be "my car pulls to the left on the highway."

In this example, the input processing component 258 processes the customer input and determines the customer input as "wheels are not aligned."

In some embodiments, the vehicle diagnostic management service 122 can be configured to utilize a machine learned model 256 to process the natural language provided as a customer input. For example, if the customer input is "my car stink," the machine learned model 256 may process the customer input and determine the customer input as "heating ventilation and air conditioning (HVAC) system malfunction."

In some embodiments, the vehicle diagnostic management service 122 receives the customer input as a set of vehicle symptoms. In these embodiments, the customer device 130 may provide a list of vehicle symptoms, and the customer may select one or more symptoms from the list of vehicle symptoms. For example, the customer device 130 may has a list of predefined vehicle symptoms, such as "engine check light on," "vehicle vibration," "safety feature inoperable," "battery malfunction," etc. In this example, the customer may select one or more symptoms from the list of predefined vehicle symptoms. Then, the input processing component 258 may receive the customer input and transmit it to other components, such as a vehicle symptom analysis component 260, action group identification component 262, and/or service feedback component 264, for further performing the vehicle service.

At block 406, the vehicle diagnostic management service 122 determines whether the vehicle diagnostic management service 122 identified one or more key terms by processing the customer input. If the vehicle diagnostic management service 122 did not identify the key term(s), the vehicle diagnostic management service 122 may request additional customer input at block 408. If the vehicle diagnostic management service 122 identified one or more key terms, the routine proceed to block 410.

At block 410, the vehicle diagnostic management service 122 can predict symptoms associated with the customer input. In some embodiments, the vehicle diagnostic management service 122 utilizes the identified key terms by processing the customer input to predict one or more symptoms related to the customer input. For example, if the key term extracted from the customer input is a "touchscreen mal-function," the vehicle diagnostic management service 122 may predict symptoms related to the touchscreen, such as "screen pixel malfunctioning," "screen discolored," "cosmetic issue," etc.

In some embodiments, the vehicle diagnostic management service 122 is configured to utilize the machine learned model 256 to predict the symptoms based on the key terms. In these embodiments, the machine learned model 256 might predict the symptoms by utilizing one or more machine learning algorithms to generate one or more prediction models or parameter functions to predict the symptoms. For example, if an extracted key term from a customer input (such as "my car stink") is a "heating ventilation and air conditioning (HAVC) system malfunction," the vehicle diagnostic management service 122 might predict the following symptoms: "heating system is not working," "air vent is not opening," "evaporator mal-functioning," etc. In some embodiments, the machine learned model 256 uses the vehicle profile to predict the symptoms, such as the location of the vehicle, vehicle service history, etc. For example, if the vehicle is located in a humid area, the machine learned model 256 may predict symptoms by considering the geographical characteristic, such that the symptoms can further include "vehicle cabin has a mold." In another example, if the vehicle has a service history, such as an "evaporator cleaning," the machine learned model 256 may predict a symptom as "evaporator has a mold."

In some embodiments, the vehicle diagnostic management service 122 may generate a confidence value associated with each symptom. For example, if the symptoms include "heating system is not working," "air vent is not opening," and "evaporator mal-functioning," the vehicle symptom analysis component 260 generates a confidence value for each symptom, such as "60%," "70%", and "80%," respectively. In some embodiments, the confidence value is determined based on analyzing the same or similar types of vehicles' service records. For example, the confidence value can be determined by analyzing service records related to the same type of vehicles or similar types of vehicles. In some embodiments, the confidence value can be based on analyzing the customer's profile. For example, the confidence value can be determined by considering the customer's geographic region. In some embodiments, the confidence value can also be determined based on analyzing the customer's service history. For example, symptoms that are related to one of the customer's service history can have a higher confidence value. In some embodiments, the vehicle symptom analysis component 260 can utilize the machine learned model 256 to determine the confidence value. These embodiments are provided as examples, and the present disclosure is not limited by the above embodiments.

At block 412, the vehicle diagnostic management service 122 determines whether the vehicle diagnostic management service 122 predicted one or more symptoms. If the vehicle diagnostic management service 122 did not predict the symptoms, the vehicle diagnostic management service 122 may request additional customer input at block 408. If the vehicle diagnostic management service 122 predicted the symptoms, the routine proceeds to block 414.

At block 414, the vehicle diagnostic management service 122 can identify action groups associated with the predicted vehicle symptoms. In some embodiments, the action group represents a set of corrective actions to perform a vehicle service, including diagnosis or repairing of the vehicle corresponding to the predicted symptoms. For example, if one of the predicted symptoms is a "screen pixel malfunctioning," the action group can include "perform screen pixel diagnosis" and "replace touch screen if the diagnosis result is failed."

In some embodiments, action groups may be illustratively mapped or clustered based on the organization of a vehicle, such that action groups may be able to be matched to the major organizational groups of a vehicle (e.g., power train, HVAC, etc.). Other action groups may be mapped to individual components or services. Still, further, action groups may be continuously monitored, adjusted, or updated based on processing results by the network service provider. For example, an action group that is rarely selected may be modified or blended. In another example, an action group that does not result in appropriate service experience or an incorrect diagnosis may be eliminated, updated, or divided.

In some embodiments, the vehicle diagnostic management service 122 may map the customer input with the identified action group. For example, as shown in the above, if the customer's input is "my car has a yellow border around the touchscreen," the identified action groups, "perform screen pixel diagnosis" and "replace touch screen if the diagnosis result is failed," can be mapped with the customer input. In some embodiments, each customer input can be mapped with multiple action groups based on the customer input and predicted symptoms.

At block 416, the vehicle diagnostic management service 122 can prioritize the identified action groups. In some embodiments, the vehicle diagnostic management service 122 may prioritize the identified action groups based on the confidence value corresponding to each symptom as predicted in the vehicle symptom analysis component 260. For example, if the symptoms include "heating system is not working," "air vent is not opening," and "evaporator mal-functioning," with a confidence value of "60%," "70%", and "80%," respectively, the identified action group corresponding to the "evaporator mal-functioning" can have the highest priority. In this example, the identified action group corresponding to the "air vent is not opening" and "heating system is not working" can be prioritized based on the confidence value. In some embodiments, the action group identification component 262 can utilize the machine learned model 256 to identify the action group corresponding to each predicted symptom.

In some embodiments, the vehicle diagnostic management service 122 may filter the identified action groups based on the confidence value. In these embodiments, action groups associated with symptoms having a confidence value less than the threshold or criteria can be filtered. For example, if the threshold confidence value is 75% and the symptoms include "heating system is not working," "air vent is not opening," and "evaporator mal-functioning," with a confidence value of "60%," "70%", and "80%," respectively, the action groups associated with the "heating system is not working" or "air vent is not opening can be filtered. Thus, the vehicle diagnostic management service 122 may not perform the diagnostic associated with the filtered action groups.

At block 418, the vehicle diagnostic management service 122 can provide a vehicle diagnostic management service based on the identified action groups. In some embodiments, some action groups may specify a wide variety of actions, which may be in a logical order (e.g., information gathering/diagnostic/repair). In other embodiments, an action group may be limited to specific types of actions, such as diagnostic or repair, while omitting other actions, e.g., information gathering. The actions can also be structured or ordered in a manner such that the outcome/result of a preceding action may have dependency or influence on the subsequent actions (e.g., values from information gather may dictate which diagnostic actions are selected). Still, further, the actions may also include prioritization information that can be utilized in the execution/authorization of the action. For example, an action that is characterized as a critical service action may not only elicit action for diagnostics or repair but also include information that provides prioritization information. The prioritization information can be utilized in how or when notifications are provided to the customers (e.g., alerting). The prioritization information can also be utilized to elicit a more immediate response from the service provider, such as prioritization in scheduling services or providing alternative transportation.

In some embodiments, the vehicle diagnostic management service 122 identifies the action group corresponding to each predicted symptom and generate feedback. For example, if the action group includes "perform screen pixel diagnosis" and "replace touch screen if the diagnosis result is fail," the vehicle diagnostic management service 122 may generate feedback, such as "request to perform a screen pixel diagnosis," and transmit the feedback to the customer via the customer device 130. In these embodiments, the customer may consent to perform the screen pixel diagnosis, and the vehicle diagnostic management service 122 may perform the diagnosis. In some embodiments, the vehicle diagnostic management service 122 may provide the diagnostic result to the customer by transmitting the diagnosis result to the customer device. In these embodiments, the vehicle diagnostic management service 122 may provide a repair procedure. For example, the vehicle diagnostic management service 122 may generate feedback, such as "diagnosis fail," and provide a repair procedure, such as "replace touch screen." In some embodiments, vehicle diagnostic management service 122 may provide vehicle parts required for the repair and estimated repair time and cost. For example, the vehicle diagnostic management service 122 may provide a repair part, such as a "touch screen," and estimated time for replacing the touch screen and cost for replacing the touch screen.

The routine 400 terminates at block 420.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed decision and control algorithms. It is to be understood that the forms of disclosure herein shown and described are to be taken as representative embodiments. Equivalent elements, materials, processes, or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer those two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application.

What is claimed is:

1. A system for managing vehicle diagnostics based on processed user inputs, the system comprising one or more external computing devices associated with a processor and a memory for executing computer-executable instructions to implement a vehicle diagnostic management service, wherein the vehicle diagnostic management service is configured to:
   obtain a set of customer inputs related to one or more services of a vehicle;
   process the set of customer inputs to identify one or more key terms;
   predict, based on the one or more key terms, symptoms, wherein the symptoms are associated with the one or more key terms;
   determine respective confidence values of the predicted symptoms, wherein at least one confidence value is determined based on historical information associated with the vehicle;
   identify action groups associated with the predicted symptoms, wherein an individual predicted symptom is mapped with an individual action group from the action groups;
   determine respective priorities associated with the action groups based on relative rankings of the identified confidence values; and
   provide vehicle diagnostic based on the priorities associated with the action groups.

2. The system as recited in claim 1, wherein the set of customer inputs is a natural human language.

3. The system as recited in claim 2, wherein the vehicle diagnostic management service is further configured to process the natural human language.

4. The system as recited in claim 1, wherein the vehicle diagnostic management service provides vehicle services based on the prioritization.

5. The system as recited in claim 1, wherein each of the one or more action groups defines a set of actions including diagnostic or corrective action.

6. The system as recited in claim 1, wherein the one or more action groups are mapped based on an organization of the vehicle, wherein the organization of the vehicle includes one or more vehicle hardware components.

7. The system as recited in claim 1, wherein the one or more action groups are continuously updated.

8. A computer-implemented method for managing vehicle diagnostics based on processed user inputs, the method comprising:
   obtaining a set of customer inputs related to one or more services of a vehicle;
   processing the set of customer inputs to identify one or more key terms;
   predicting, based on the identified one or more key terms, symptoms, wherein the symptoms are associated with the one or more key terms;

determining respective confidence values of the predicted symptoms, wherein at least one confidence value is determined based on historical information associated with the vehicle;

identifying action groups associated with the predicted symptoms, wherein an individual predicted symptom is mapped with an individual action group from the action groups;

determining respective priorities associated with the action groups based on the identified confidence values; and providing vehicle diagnostic based on the priorities associated with the action groups.

9. The computer-implemented method of claim 8, wherein the customer input is a natural human language.

10. The computer-implemented method of claim 8, wherein the vehicle diagnostic management service provides vehicle diagnostic based on the prioritization.

11. The computer-implemented method of claim 8, wherein the prioritization represents ranking of the action groups.

12. The computer-implemented method of claim 8, wherein determining the respective confidence values of the predicted symptoms is based on a machine learning model.

13. The system as recited in claim 1, wherein the prioritization represents ranking of the action groups.

14. The system as recited in claim 1, wherein the determination of the respective confidence values of the predicted symptoms is based on a machine learning model.

* * * * *